Oct. 25, 1960
M. BAUMANN ET AL
2,957,506
DEVICE FOR THE MANUFACTURE OF SMALL PARQUET BATTENS
Filed Sept. 19, 1958
3 Sheets-Sheet 1
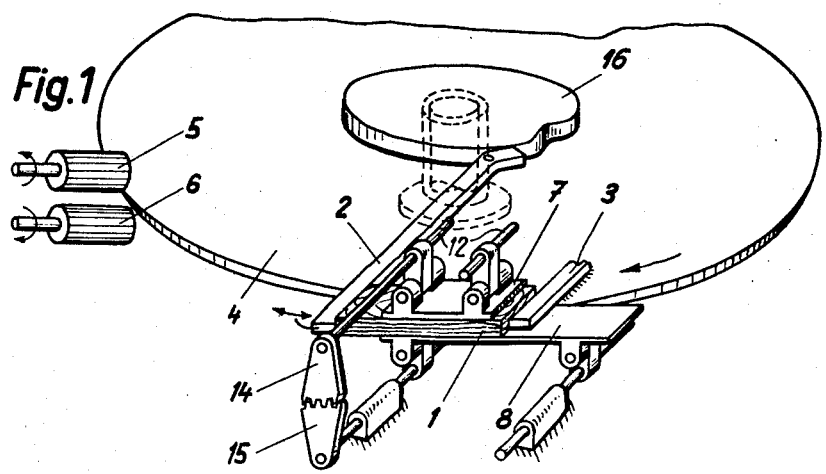
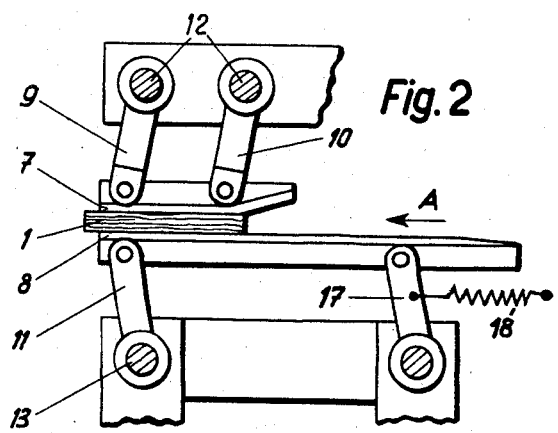
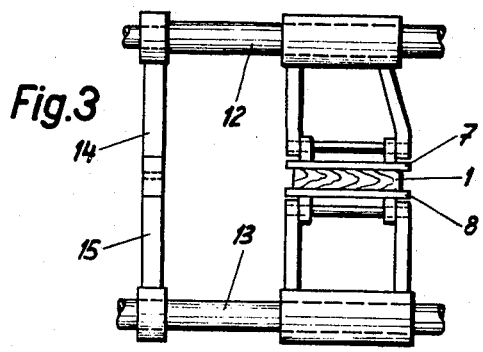
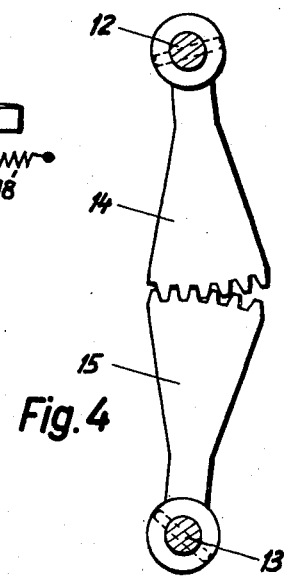
INVENTORS:
MANFRED BAUMANN
EUGEN SCHNEIDER

INVENTORS
MANFRED BAUMANN
EUGEN SCHNEIDER

2,957,506
DEVICE FOR THE MANUFACTURE OF SMALL PARQUET BATTENS

Manfred Baumann, St. Margrethen, Switzerland, and Eugen Schneider, Hochst, Vorarlberg, Austria, assignors to Bauwerk A.G., St. Margrethen, Switzerland Filed Sept. 19, 1958, Ser. No. 762,046

Claims priority, application Switzerland Sept. 19, 1957

4 Claims. (Cl. 144—116)

The present invention relates to a device designed for the manufacture of small parquet battens and in particular to a planing attachment.

It is a primary object of this invention to provide means which centers a plank section with respect to its thickness exactly in the mid-position between planing rollers so as to minimize the planing allowance required.

It is a further object of this invention to provide means enabling the use of plank sections of varying thickness and to adjust each irrespective of its dimensions, exactly in the correct mid-position between two planing rollers.

It is an advantage of this invention that warped plank sections can be used and that the amount of waste and rejects are reduced.

An embodiment of this invention is shown by way of example in the accompanying drawings, in which:

Fig. 1 is a simplified perspective view of the centering device on a turntable-type planing arrangement, Fig. 2 is a side view of the centering device, Fig. 3 is a front view of the centering device, Fig. 4 shows a detail of the centering device;

Figure 5:
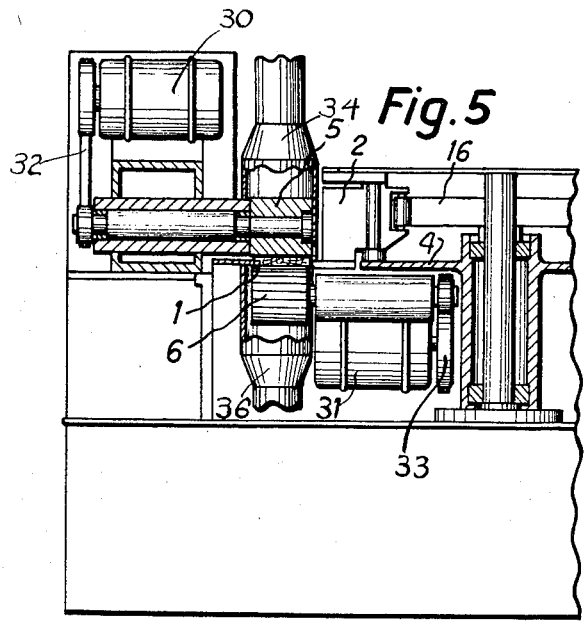
Fig. 5 is a partial vertical sectional view of the device illustrating in particular the drive means for the planers.

So far, the manufacture of such small parquet battens has consisted in cutting from a plank, by means of a cut-off saw, predetermined lengths, and subsequently planing these lengths on both faces to the specified thickness, and finally cutting the lengths up lengthwise into individual battens, the thickness of the original plank section constituting the width of said battens. Only dry wood is suitable for the manufacture of parquet battens, but it unfortunately has the tendency to warp during the drying process. Even when the crude planks have substantially the same planing allowance with respect to thickness, the varying degrees of warp result in considerable differences in height when the planing operations on these plank sections are based on the assumption of a firm and flat surface, since it is likely that the plank sections will include some with a negligible warp and others with a bad warp. This has the drawback that often only one of the two sides to be planed becomes true and flat, while the other side presents undersized portions, which is, of course, not acceptable. Owing to the crosswise laying of the parquet battens, the width of each batten must be in a definite proportion to the length, so that a plank section which proves to be undersized after the planing operation cannot simply be planed down to slightly deficient dimensions, but must be planed right down to the next standard size, a procedure involving considerable waste of material.

These disadvantages are eliminated by the device according to the invention.

Referring now to Fig. 1, the plank sections 1 to be planed are gripped at their short edges by clamping arms 2, 3 on the turntable 4 and moved along past planing rollers 5, 6 which plane the plank sections 1 to the specified thickness. The detailed design of the gripping device and the turntable is disclosed in applicants' copending patent application No. 762,049, filed September 19, 1958 for Method and Device for the Manufacture of Small Parquet Battens.

The centering device as shown in Figs. 2 to 4 presents an upper and a lower clamping plate 7, 8 between which the plank section 1 is positioned, whereby the clamping plates rest against the surfaces to be planed. Each clamping plate 7, 8 is movably connected to two levers 9, 10 and 11, 17 respectively. Each lever pivots on a fixed axis of rotation, in such a manner that the clamping plates 7, 8 are adjustable parallel to each other in changing their distance from each other. Connected to an axis 12 of the upper plate and an opposite axis 13 of the lower plate 8 are the toothed segments 14, 15 (Fig. 4), the two segments being in toothed engagement with each other. The axes 12, 13 are secured on any suitable frame members 40, 42 of the device. Thus, the two clamping plates 7, 8 perform equal deflections so that plank sections 1, which are introduced between the two clamping plates 7, 8 in the direction of arrow A, are centered exactly in the mid-position between the planing rollers 5, 6, irrespective of the varying thickness or of any warp of the plank sections, thus ensuring that an equal allowance is available on both sides for the planing process.

The plank section 1 is moved by a rotating clamping arm 3 and after the centering procedure, the plank section 1 is clamped tight by the clamping arms 2, 3 bearing on the short edges of the plank section. The arm 2 is controlled by a stationary cam 16 mounted above the turntable 4 (Fig. 1) and the plank section is released by the arm 3 after processing. The two clamping plates 7 and 8 are preferably drawn by a spring 18 into a position in which the distance between them is a minimum.

The clamping plates 7, 8 are arranged at the circumference above and below a revolving turntable 4.

Figure 6:
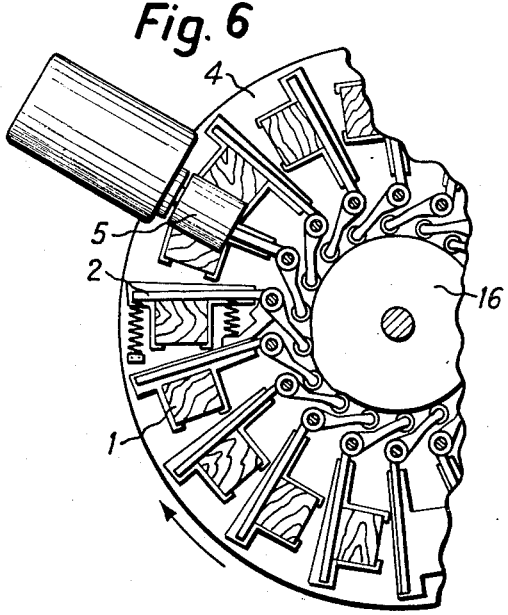
Fig. 6 is a partial plan view of the device illustrating the location of the cam and the turntable.
Figure 7:
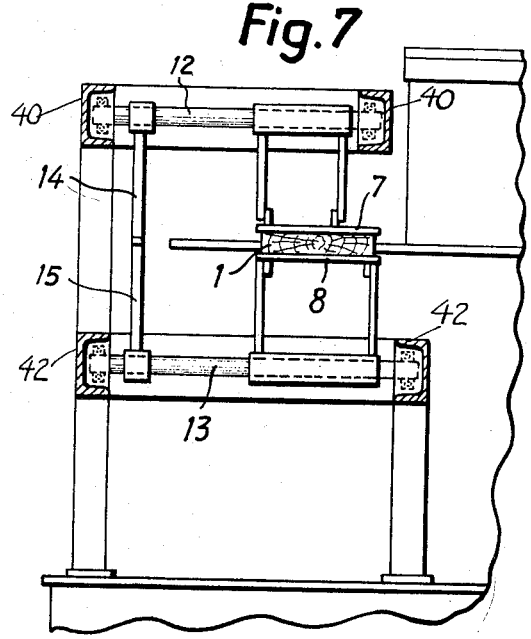
Fig. 7 is a partial plan view of the device illustrating the supporting framework thereof.
Figure 8:
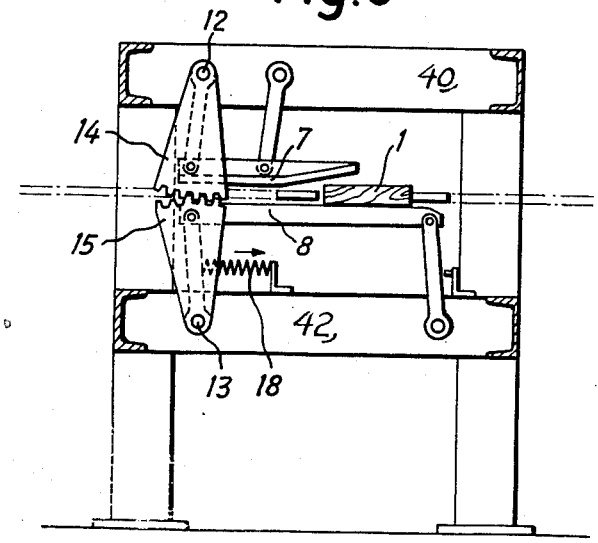
Fig. 8 is a sectional view looking in a direction normal to the plane of Fig. 7.

In Figs. 5 and 6 there is shown the motors 30, 31 for driving the planing rollers 5, 6 through belt drive 32, 33. Of course other drives may be employed as are conventional. Chips are sucked into or drop into conduits 34 and 36.

What I claim is:

1. A device for the manufacture of small parquet battens from plank sections comprising two vertically spaced cylindrical planers, a movable feed mechanism with clamping means to pass the plank sections between said two planers, centering elements designed to center the plank sections to the mid-position between the two planers independently of the varying thickness of said plank sections, said centering elements comprising two parallel adjustable centering plates between which the plank sections are passed, each centering plate being movably connected to pivoted elements each of which swings about an axis of rotation parallel to said centering plates.

2. A device according to claim 1, wherein each centering plate is movably connected to two levers each accommodating journals, at least one of said journals associated with each centering plate being rigidly connected to a toothed segment, said segments engaging each other.

3. A device according to claim 1, said clamping plates being arranged on the periphery of a revolving turntable, and said clamping means being controlled by a cam.

4. A device according to claim 1, said pivoted elements performing motions identical in magnitude but opposite in direction.

References Cited in the file of this patent

UNITED STATES PATENTS

| | | |
|---|---|---|
| 439,089 | Anthon | Oct. 28, 1890 |
| 565,463 | Kellogg | Aug. 11, 1896 |
| 677,243 | Luther | June 25, 1901 |
| 2,312,439 | Peterson | Mar. 2, 1943 |

FOREIGN PATENTS

| | | |
|---|---|---|
| 331,305 | Switzerland | Aug. 30, 1958 |